(12) United States Patent
Wong et al.

(10) Patent No.: US 8,086,213 B1
(45) Date of Patent: Dec. 27, 2011

(54) CIRCUITS, ARCHITECTURES, APPARATUSES, SYSTEMS, ALGORITHMS, METHODS, AND SOFTWARE FOR WIRELESS ARBITER POWER SAVING

(75) Inventors: Gladys Yuen Yan Wong, Fremont, CA (US); Ken Yeung, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 648 days.

(21) Appl. No.: 12/204,733

(22) Filed: Sep. 4, 2008

Related U.S. Application Data

(60) Provisional application No. 60/970,640, filed on Sep. 7, 2007.

(51) Int. Cl.
*H04B 5/00* (2006.01)
*H04B 7/00* (2006.01)

(52) U.S. Cl. .... 455/343.1; 455/82; 455/334; 455/343.2; 455/41.2; 455/515; 455/574

(58) Field of Classification Search ............... 455/343.1, 455/82, 334, 343.2, 41.2, 515, 574
See application file for complete search history.

(56) References Cited

U.S. PATENT DOCUMENTS

| | | | |
|---|---|---|---|
| 6,741,836 B2 * | 5/2004 | Lee et al. ..................... | 455/41.2 |
| 7,072,697 B2 * | 7/2006 | Lappetelainen et al. ...... | 455/574 |
| 7,203,494 B2 * | 4/2007 | Flondro et al. ................ | 455/437 |
| 7,406,296 B2 * | 7/2008 | Haartsen ...................... | 455/41.2 |
| 7,457,973 B2 * | 11/2008 | Liu ............................... | 713/310 |
| 7,596,708 B1 * | 9/2009 | Halepete et al. .............. | 713/322 |
| 2004/0116075 A1 * | 6/2004 | Shoemake et al. ........... | 455/41.2 |
| 2004/0242159 A1 * | 12/2004 | Calderon et al. ............. | 455/63.3 |
| 2005/0182977 A1 * | 8/2005 | Powers et al. ................. | 713/300 |
| 2006/0205363 A1 * | 9/2006 | Godfrey ......................... | 455/83 |
| 2006/0246932 A1 * | 11/2006 | Liang ............................ | 455/515 |
| 2006/0292986 A1 * | 12/2006 | Bitran et al. .................. | 455/41.2 |
| 2007/0140199 A1 * | 6/2007 | Zhao et al. .................... | 370/338 |
| 2008/0102885 A1 * | 5/2008 | Tu et al. ..................... | 455/553.1 |
| 2009/0170447 A1 * | 7/2009 | Marlett et al. ................ | 455/82 |
| 2009/0258607 A1 * | 10/2009 | Beninghaus et al. .......... | 455/77 |

OTHER PUBLICATIONS

U.S. Appl. No. 11/411,309, filed Apr. 2006, Halepete et al.*
U.S. Appl. No. 10/600,673, filed Jun. 2003, Liu, Yonghe.*

* cited by examiner

*Primary Examiner* — Edward Urban
*Assistant Examiner* — Walter Dreksler

(57) ABSTRACT

Circuits, architectures, systems, methods, algorithms, and software and/or firmware for arbitrating media access requests from multiple wireless communication protocol components. Exemplary circuits include a request processing circuit configured to set a positive media access grant output for a first one of the wireless component before entering a power saving mode of operation, determine a waking media access state of the first wireless component while exiting the power saving mode of operation, and process media access requests from the wireless components the waking media access state of the first wireless component. Embodiments of present invention advantageously provide for more reliable arbitration of media access requests from multiple wireless communication protocol components during and after power saving modes of operation.

31 Claims, 8 Drawing Sheets

(Background)

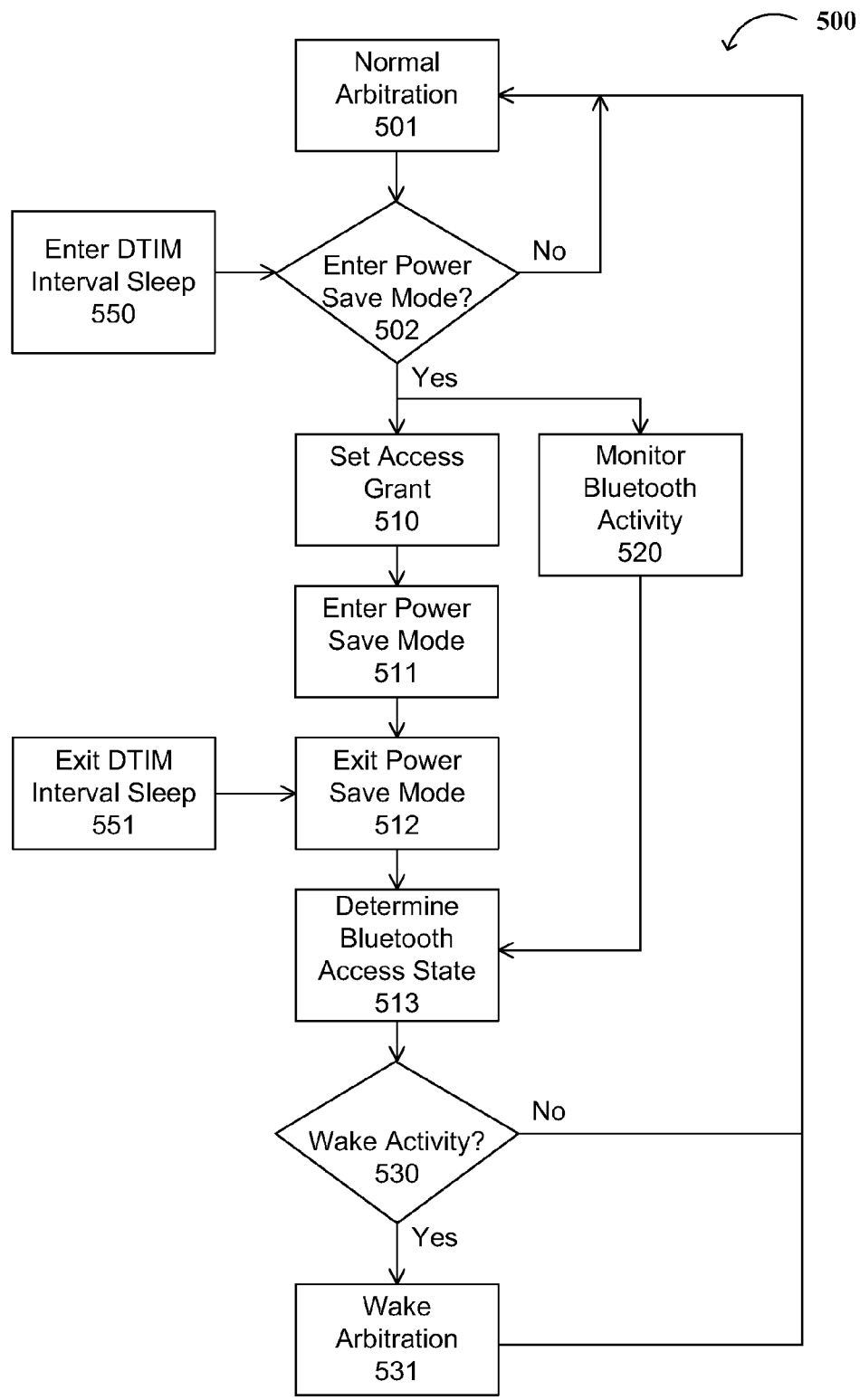

CIRCUITS, ARCHITECTURES, APPARATUSES, SYSTEMS, ALGORITHMS, METHODS, AND SOFTWARE FOR WIRELESS ARBITER POWER SAVING

RELATED APPLICATIONS

This application claims the benefit of U.S. Provisional Application No. 60/970,640, filed Sep. 7, 2007, the contents of which are incorporated herein by reference.

FIELD OF THE INVENTION

The present invention generally relates to the field of wireless communication. More specifically, embodiments of the present invention pertain to circuits, architectures, systems, methods, algorithms, and software and/or firmware for arbitrating media access requests from multiple wireless communication protocol components.

BACKGROUND

Unlicensed radio spectrum such as the industrial, scientific, and medical (ISM) radio bands are used for an increasing number of wireless applications using a variety of standards and protocols. Often, a single device is desired to operate using two or more of these standards and/or protocols in the same radio band. For example, in the 2.4 GHz ISM band a device may access a wireless personal area network (WPAN) using a protocol such as Bluetooth as well as a wireless local area network (WLAN) using a protocol such as one of the IEEE 802.11 or "Wi-Fi" protocols.

WPAN protocols such as Bluetooth are generally designed for cable-replacement applications such as wireless headsets, wireless synchronization of personal digital assistants (PDAs) with computers, wireless peripherals such as printers or keyboards, etc. Most Bluetooth implementations support a range of up to approximately 10 m and speeds of up to 700 Kb/sec for data or isochronous voice transmission. Bluetooth can typically support "piconets" of up to eight active devices, with a maximum of three synchronous-connection-oriented (SCO) links. SCO links are designed to support real-time, isochronous applications such as cordless telephony or headsets. Bluetooth also supports asynchronous connection links (ACLs) that are used to exchange data in non-time-critical applications. The Bluetooth physical (PHY) layer uses frequency-hopping spread spectrum (FHSS) at a rate of 1600 hops/sec and Gaussian frequency shift keying (GFSK) modulation. Bluetooth devices typically transmit at a power level of about 1 mW with a raw data rate of approximately 1 Mb/sec.

WLAN protocols include the IEEE 802.11 and/or Wi-Fi family of standards for wireless networking between computers and/or other devices. WLAN protocols generally provide for longer distances (100 m or more) and higher data rates (e.g., 11 Mb/sec, 54 Mb/sec, or more) than WPAN protocols. WLANs are commonly used for internet access, e-mail, file sharing, etc. Like Ethernet, Wi-Fi supports true multipoint networking with such data types as broadcast, multicast, and unicast packets. The MAC address built into every device allows a virtually unlimited number of devices to be active in a given network. These devices contend for access to the airwaves using a scheme called carrier sense multiple access with collision avoidance (CSMA/CA). The Wi-Fi physical layer uses direct-sequence spread spectrum (DSSS) at four different data rates using a combination of differential binary phase-shift keying (DBPSK) for 1 Mb/sec, differential quaternary phase-shift keying (DQPSK) for 2 Mb/sec, and QPSK/complementary code keying (CCK) for 5.5 and 11 Mb/sec. The RF power level can vary, but is typically between 30 and 100 mW in typical WLAN devices.

WPAN and WLAN are generally complementary rather than competing technologies. In particular, coexistence of Bluetooth and Wi-Fi devices is increasingly desired. Because both technologies occupy the 2.4 GHz frequency band, there is potential for interference between the two technologies. The coexistence of two wireless applications such as Bluetooth and Wi-Fi in the same radio band, but with different channel access protocols, requires particular attention to simultaneous operation of both systems in very close proximity.

If Bluetooth and Wi-Fi operate at the same time in the same place, they will interfere (collide) with each other. Specifically, these systems transmit on overlapping frequencies, creating in-band colored noise for one another. The sidebands of each transmission must also be accounted for. Interference between Bluetooth and Wi-Fi may occur, for example, when a Wi-Fi receiver senses a Bluetooth signal at the same time a Wi-Fi signal is being sent to it or when a Bluetooth receiver senses a Wi-Fi signal at the same time a Bluetooth signal is being sent to it.

One solution is to use a Bluetooth coexistence arbiter (BCA) as a media access control (MAC) layer to perform synchronization between the different protocols, and ensure that bandwidth over the shared spectrum is allocated in a non-concurrent yet fair basis. Such a solution would eliminate any potential conflict and still maintain inherent link performance attributes. FIG. 1 shows an exemplary wireless device 100 with WLAN component 101 and Bluetooth component 102. WLAN component 101 and Bluetooth component 102 generally send media access requests to media access controller 103, which applies arbitration rules to determine whether to allow a media access grant and to provide the protocol components 101 and 102 with access to the antenna system for receiving and/or transmitting.

In some coexistence implementations the BCA may reside in the WLAN subsystem while an external Bluetooth component (which may, for example, comprise a separate logical component of the same integrated circuit device as the BCA and/or the WLAN or may be located on a separate integrated circuit device) communicates via an interface to request medium access. As a result, when the WLAN component enters a WLAN power-save mode, both the WLAN component and the integrated BCA component may enter a sleep or other power saving mode of operation (e.g., by gating one or more clock signals, removing core voltage, etc.) for relatively long intervals (typically 100 ms) between waking periods. When the BCA shares the same clock and power domain as WLAN, the BCA may have a blind period during the WLAN power-save interval and be unaware of any Bluetooth activity. The Bluetooth link may be dropped if Bluetooth is denied media access during the WLAN power-save interval.

One solution to this problem is for the BCA to "force" a media access grant to the Bluetooth component just prior to entering the WLAN power-save mode. This resolves the problem of dropping the Bluetooth link during the WLAN power-save mode. However, upon WLAN wakeup, the BCA may be in an unknown state. If the BCA removes the forced Bluetooth grant, it may disrupt an ongoing Bluetooth activity. If this occurs often, as when the WLAN repeatedly wakes to listen for beacons then returns to sleep mode during the sleep interval, then there will be periodic disruptions to the Bluetooth link.

It may therefore be advantageous to arbitrate grant requests after the arbiter wakes from a sleep state based on media access activity that occurs at or before the time when the arbiter wakes from the sleep state.

SUMMARY

Embodiments of the present disclosure relate to circuitry, architectures, systems, methods, algorithms, and software and/or firmware for arbitrating media access requests from multiple wireless components. The wireless components may include components that are configured to process radio frequency (RF) input and/or RF output signals according to different wireless communication protocols. Specific embodiments relate to Bluetooth and/or wireless local area network (WLAN) components, but it will be recognized that the operations and concepts presented herein are applicable to a wide variety of coexisting wireless protocol components.

Exemplary circuits include a request processing circuit configured to set a positive media access grant output for a first one of the wireless components before entering a power saving mode of operation, determine a waking media access state of the first wireless component while exiting the power saving mode of operation, and process media access requests based on the waking media access state of the first wireless component.

In exemplary embodiments, the wireless components include wireless local area network (WLAN) components and/or Bluetooth components. The request processing circuit may be configured to enter the sleep mode of operation in response to a power mode of one or more of the wireless components. Thus, where a second one of the wireless components comprises a WLAN component, the request processing circuit may enter the power saving mode of operation in response to a sleep mode of the WLAN component during a delivery traffic indication message (DTIM) interval and/or a wake mode of the WLAN component, (e.g., when the WLAN protocol component is configured to wake up to listen for a DTIM beacon). In a further embodiment, the request processing circuit may be configured to pre-assert a WLAN grant request (e.g., without receiving a grant request from the WLAN component) to listen for the DTIM beacon when waking up.

In another embodiment, the request processing circuit is configured to operate in a shared clock domain with one or more of the protocol components (e.g. a WLAN component). Thus, one or more clock signals in the clock domain may be stopped during the power saving mode of operation, thereby conserving power in both the protocol component and the request processing circuit.

In some embodiments, the waking media access state of the first (e.g., non-sleeping) wireless component comprises a presence and/or absence of signal activity between the second protocol component and an antenna, a direction of the signal activity (e.g., transmit and/or receive), and/or a priority of the signal activity. In a further embodiment the request processing circuit is further configured to process the media access grant requests according to a first arbitration protocol (e.g., a set of rules for granting and/or denying media access) when signal activity is present and according to a second arbitration protocol when there is no signal activity at the time of waking. For example, when signal activity is present, the arbitration protocol may include favoring access by the first protocol component (e.g., to allow a transmission and/or reception activity to complete). In another embodiment the request processing circuit may be configured to arbitrate the media access requests according to the second arbitration protocol (e.g., a normal arbitrations protocol) after the signal activity ends.

The circuit may also include a signal activity monitoring circuit configured to monitor signal activity between the first protocol component and an antenna. In some embodiments, the signal activity monitoring circuit may be configured to operate during the power saving mode of operation of the request processing circuit (e.g., to monitor the direction, priority, and/or other properties of the signal activity), and the request processing circuit may be configured to determine the waking media access state based on an output of the signal activity monitoring circuit.

In other embodiments, the signal activity monitoring circuit may be configured to store information about the signal activity in a memory during the power saving mode of operation of the request processing circuit and to sleep during a normal mode of operation of the request processing circuit. A further embodiment includes an analysis circuit configured to analyze the stored information to predict the waking media access state. Alternatively, the waking media access state may be predicted based on a Bluetooth data link type and/or a Bluetooth profile supported by the Bluetooth protocol component.

Exemplary methods for arbitrating media access include steps of setting a positive media access grant indicator for a first one of the wireless components before entering the power saving mode of operation determining a waking media access state of the first wireless component while exiting the power saving mode of operation, and processing media access requests from the wireless components based on the waking media access state of the first wireless component.

The architectures and/or systems generally comprise those that include a circuit or other device embodying one or more of the inventive concepts disclosed herein. Embodiments of the present invention may include one or more integrated circuit devices (e.g., general purpose microprocessors, system-on-chip [SOC] devices, application specific integrated circuits [ASICs], etc.) or other apparatuses that include the circuits and/or perform the operations described herein. Such integrated circuit devices may also include, for example, one or more of the wireless communication protocol components, and/or an antenna path switch circuit configured to enable antenna paths in response to the media access grant outputs. For example, an integrated circuit device may include an arbitration circuit and one of the protocol components, while a second integrated circuit device may include the other protocol component.

The software may include one or more computer-readable medium comprising computer-readable instructions adapted to perform the operations disclosed herein. Similarly, embodiments of the present invention may include one or more programmable devices configured to perform the operations described herein, and/or computer-readable media including instructions adapted to configure such a programmable device to perform these operations.

Embodiments of present invention advantageously provide for more reliable arbitration of media access requests from multiple wireless communication protocol components during and after power saving modes of operation.

These and other advantages of the present invention will become readily apparent from the detailed description of embodiments below.

BRIEF DESCRIPTION OF THE DRAWINGS

FIG. 5 is a diagram of an exemplary embodiment of a method for arbitrating media access requests from a WLAN component and a Bluetooth component.

DETAILED DESCRIPTION

Figure 1:
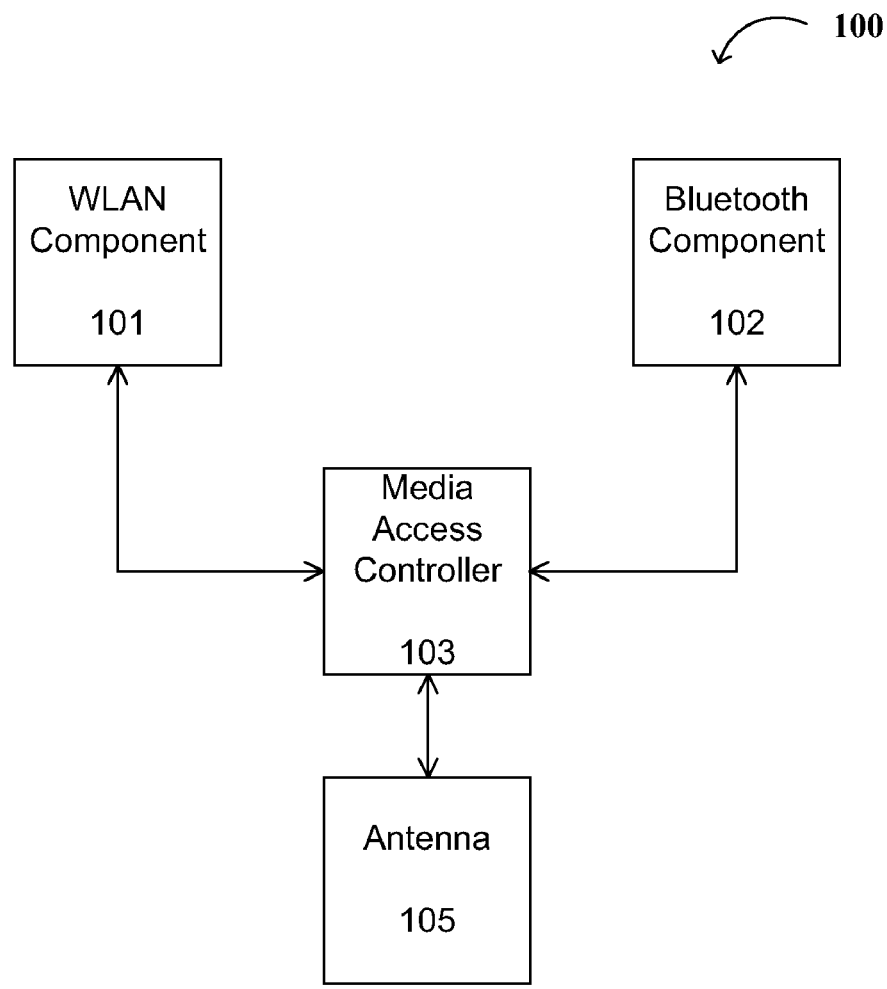
FIG. 1 is a diagram showing a multi-protocol wireless communication device.

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the embodiments of the present invention, numerous specific details are set forth in order to provide a thorough understanding of the embodiments of the present invention. However, it will be readily apparent to one skilled in the art that the embodiments of the present invention may be practiced without these specific details. In other instances, well-known methods, procedures, components, and circuits have not been described in detail so as not to unnecessarily obscure aspects of the embodiments of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to exemplary embodiments.

An Exemplary Multi-Protocol Media Access Architecture

Figure 2:
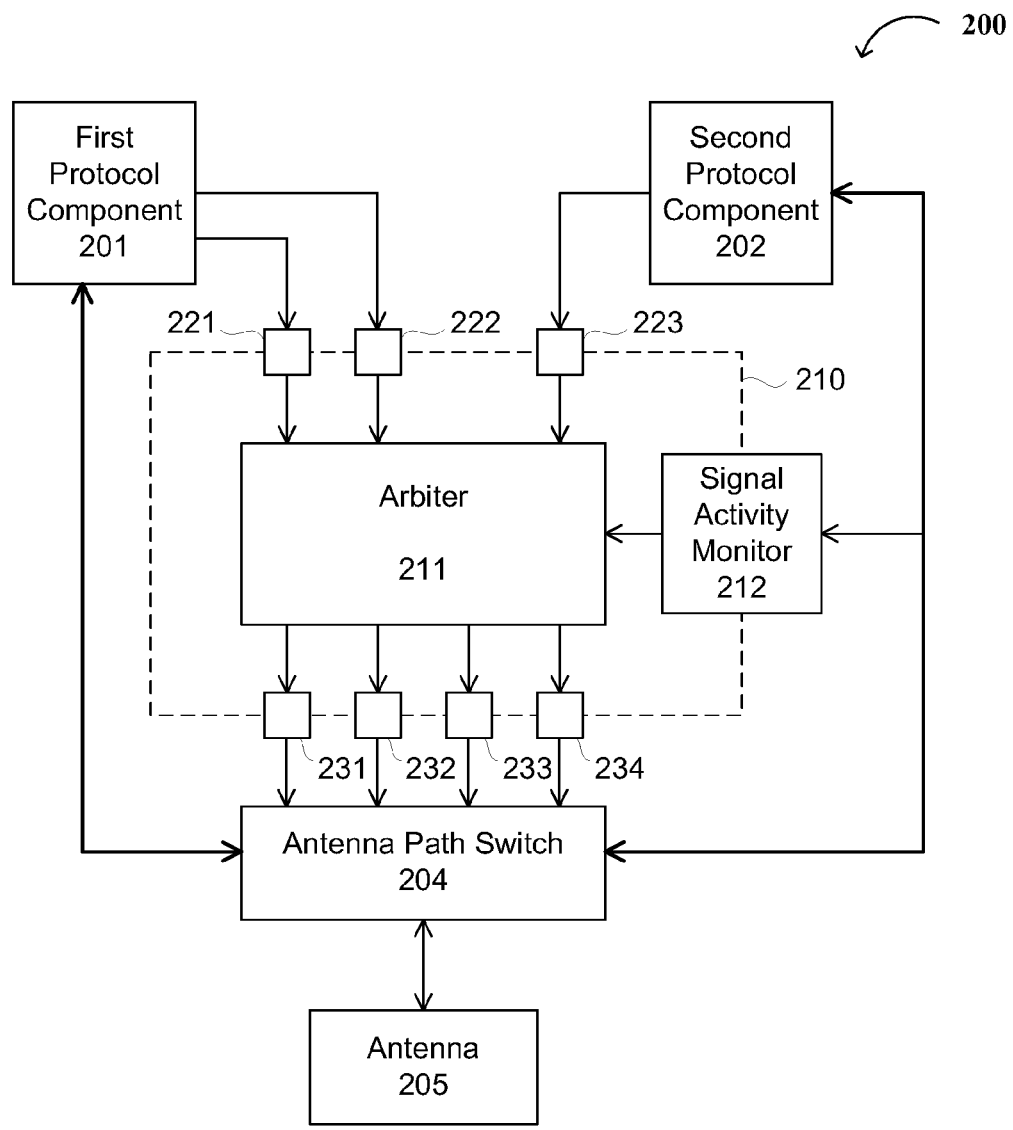
FIG. 2 is a diagram showing an exemplary embodiment of a multi-protocol wireless communication device.

FIG. 2 shows an exemplary architecture 200 for arbitrating media access requests from wireless protocol components 201 and 202. Each of the protocol components 201 and 202 is generally configured to process radio frequency (RF) input and/or RF output signals according to different wireless communication protocols. The wireless communication protocols may include, for example, wireless personal area network (WPAN) protocols, wireless local area network (WLAN) protocols, wireless wide area network (WWAN) protocols, etc. Architecture 200 is particularly advantageous for arbitrating media access requests when protocol components 201 and 202 operate in the same RF bands and/or in RF bands that potentially interfere with each other.

Architecture 200 includes request processing circuit 210. Request processing circuit 210 includes arbiter 211 for processing media access requests from protocol components 201 and 202 (e.g., media access requests received at inputs 221 and/or 223) and setting media access grants (e.g., at media grant outputs 231 to 234) based on arbitration rules for the protocol components. In response to the media grant outputs, antenna path switch 204 switches transmit signals from protocol component 201 and/or second protocol component 202 to antenna 205 and/or receive signals from antenna 205 to one or more of the protocol components.

Request processing circuit 210 is generally configured to enter a power saving mode of operation in response to a power state of first protocol component 201 (e.g., in response to input signal 222) and to set a positive media access grant output for second protocol component 202 before entering a power saving mode of operation. When request processing circuit 210 exits the power saving mode of operation (e.g., in response to a wake state of first protocol component 201), request processing circuit 210 determines a waking media access state of the second protocol component 202 (e.g., from signal activity monitor 212). If the second protocol component 202 is in an active state, then arbiter 211 may be configured to enter a "wake" state and to apply a different set of arbitration rules (e.g., to allow the second protocol component 202 to remain active unless the first protocol component 201 has a high priority request).

Figure 3:
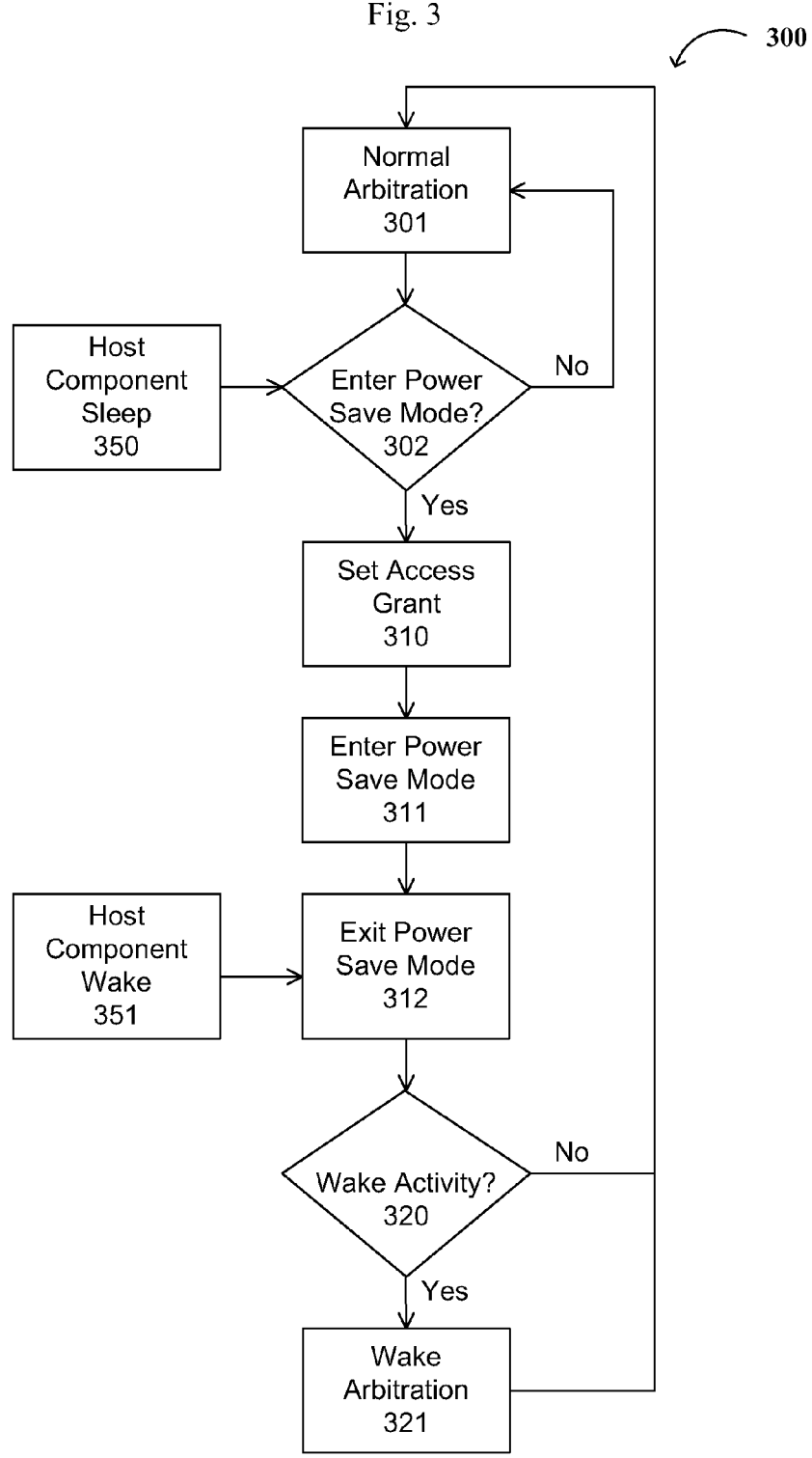
FIG. 3 is a diagram showing an exemplary embodiment of a method for arbitrating media access requests from multiple wireless protocol components.

FIG. 3 shows an exemplary method 300 of arbitrating media access requests in response to power saving modes. At step 301, arbiter 211 processes media access requests based on normal arbitration rules for the protocol components. At step 302, arbiter 211 determines whether to enter a power saving mode of operation. For example, if arbiter 211 shares a power and/or clock domain with one of the protocol components (e.g., first protocol component 201), then arbiter 211 may enter a power saving mode in response to the component entering a sleep mode at step 350. At step 310, arbiter 211 sets a media access grant (e.g., to allow transmit and receive access) for the non-sleeping protocol component (e.g., protocol component 202), then enters the power saving mode at step 311.

At step 312, arbiter 211 exits the power saving mode (e.g., in response to the host component waking from sleep). At step 320, arbiter 211 determines whether the non-sleeping component has signal activity. For example, request processing circuit 210 may include signal activity monitor 212, which may be configured to determine whether signal activity between second protocol component 202 and antenna 205 is occurring at the time when arbiter 211 wakes. Thus, when arbiter 211 wakes it may query signal activity monitor 212 to determine whether second protocol component 202 is active. If signal activity is detected at step 320, then arbiter 211 may apply the "wake" state arbitration rules at step 321. Arbiter 211 may return to normal arbitration at step 301 after the waking signal activity has ended. Alternatively, arbiter 211 may return directly to sleep mode at step 311.

In an alternative embodiment, request processing circuit 210 may include and/or may be in communication with a signal activity monitor 212 that does not sleep, and which may listen for signal activity from second protocol component 202 while arbiter 211 and/or other components of request processing circuit 210 are in a sleeping mode (e.g., while a clock domain shared by first protocol component 201 and request processing circuit 210 is disabled). Thus, when arbiter 211 wakes it may query signal activity monitor 212 to determine whether second protocol component 202 is active, as well as determine information about the signal activity that might only be determinable by monitoring the signal activity during the sleep mode. In such an embodiment, the "wake" arbitration rules may be more finely tuned to the type of signal activity taking place. For example, the "wake" arbitration rules may make media access decisions based on direction (e.g., transmit or receive), priority, transfer type, mode of operation, required latency, and/or other characteristics of the waking signal activity.

Signal activity monitor 212 may, for example, be configured to store information about the signal activity in a memory during a normal mode of operation of request processing circuit 210 and/or to sleep during the power saving mode of operation of request processing circuit 210. Request processing circuit 210 may also include an analysis circuit configured to analyze the stored information to predict the waking media access state.

An Exemplary WLAN/Bluetooth Coexistence Arbiter

Figure 4:
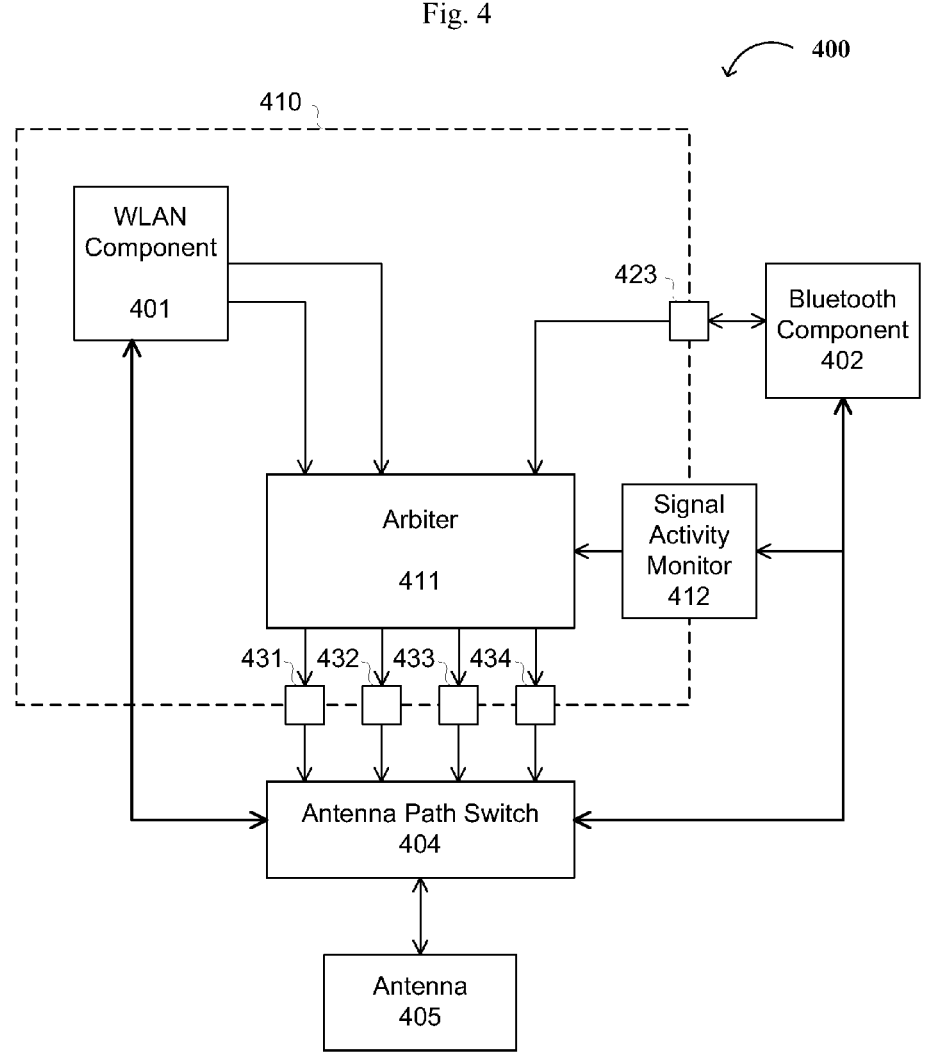
FIG. 4 is a diagram of an exemplary wireless local area network (WLAN) and Bluetooth coexistence arbiter.

FIG. 4 shows an exemplary coexistence arbiter 400 for arbitrating media access requests from a WLAN protocol component 401 and a Bluetooth component 402. Architecture 400 includes arbiter 411 for processing media access requests from WLAN component 401 and Bluetooth component 402 and setting media access grants (e.g., at media grant outputs 431 to 434) based on arbitration rules designed for the WLAN and Bluetooth protocols. In response to the media grant outputs, antenna path switch 404 switches transmitted signals from WLAN component 401 and/or Bluetooth component 402 to antenna 405 and/or received signals from antenna 405 to one or more of the protocol components.

Arbiter 411 may be configured to operate in the same clock and/or power domain 410 as WLAN component 401. Thus, one or more clock and/or power signals in the clock domain may be stopped during the power saving mode of operation, thereby conserving power in both WLAN component 401 and arbiter 411. Arbiter 411 is generally configured to enter a power saving mode of operation in response to a power state WLAN component 401 and to set a positive media access grant output for Bluetooth component 402 before entering a power saving mode of operation. When arbiter 411 exits the power saving mode of operation (e.g., in response to a wake state of WLAN component 401), it may determine a waking media access state of Bluetooth component 402 (e.g., from signal activity monitor 412). If the Bluetooth component 402 is in an active state, then arbiter 411 may be configured enter a "wake" state and to apply a different set of arbitration rules (e.g., to allow the Bluetooth component 402 to remain active unless the WLAN component 401 has a high priority request).

FIG. 5 shows an exemplary method 500 of arbitrating media access requests between WLAN and Bluetooth components in response to power saving modes. At step 501, arbiter 411 processes media access requests based on normal arbitration rules. At step 502, arbiter 411 determines whether to enter a power saving mode of operation. For example, WLAN component 401 may enter a sleep mode during a delivery traffic indication message (DTIM) interval at step 550. At step 510, arbiter 411 sets a media access grant (e.g., to allow transmit and receive access) for Bluetooth component 402, then enters the power saving mode at step 511.

At step 520, the Bluetooth signal activity is monitored. Step 520 may be performed either during the sleep mode or while waking from the sleep mode, as described herein with respect to signal activity monitor 412 of FIG. 4. At step 512, arbiter 411 exits the power saving mode (e.g., when WLAN component 401 is configured to wake up to listen for a DTIM beacon). Alternatively, the waking media access state may be predicted and/or pre-asserted based on a Bluetooth data link type and/or a Bluetooth profile supported by the Bluetooth component 402.

At step 513, the arbiter 411 determines whether the Bluetooth component 402 has signal activity (e.g., from the results of step 520). If signal activity is detected then at step 530 the arbiter 411 proceeds to apply the "wake" state arbitration rules at step 531. Arbiter 411 may return to normal arbitration at step 501 after the waking signal activity has ended. Alternatively, arbiter 411 may return directly to sleep mode at step 511.

Exemplary Software

Embodiments of the present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, embodiments of the invention may further relate to a computer program, computer-readable medium, or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

Exemplary waveforms are generally configured for transmission through an appropriate medium, such as copper wire, a conventional twisted pair wireline, a conventional network cable, a conventional optical data transmission cable, or even air or a vacuum (e.g., outer space) for wireless signal transmissions.

The waveforms and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit). The codes and/or instructions may directly implement the operations described here. Alternatively, one or more of the codes or instructions may be adapted to configure a device (e.g., a programmable circuit device) to form the circuits and/or components and/or to perform the operations described herein.

Exemplary Systems

The architectures and/or systems generally comprise those that include a circuit or other device embodying one or more of the inventive concepts disclosed herein. Embodiments of the present invention may include one or more integrated circuit devices (e.g., general purpose microprocessors, system-on-chip [SOC] devices, application specific integrated circuits [ASICs], etc.) or other apparatuses that include the circuits and/or perform the operations described herein. Such integrated circuit devices may also include, for example, one or more of the wireless communication protocol components, and/or an antenna path switch circuit configured to enable antenna paths in response to the media access grant outputs. For example, an integrated circuit device may include an arbitration circuit and one of the protocol components, while a second integrated circuit device may include the other protocol component.

Figure 6A:
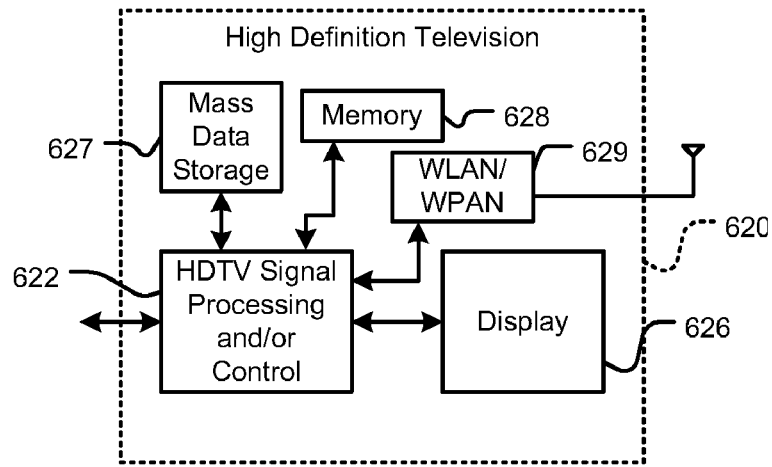
FIGS. 6A-6F are diagrams showing exemplary systems in which the present invention may be used.

Referring now to FIG. 6A, embodiments of the present invention can be implemented in a high definition television (HDTV) 620. Embodiments of the present invention may implement either or both signal processing and/or control circuits, which are generally identified in FIG. 6C at 622, a WLAN interface and/or mass data storage of the HDTV 620. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices. The HDD may be a mini HDD that includes one or more platters having a diameter that is smaller than approximately 1.8". The HDTV 620 may be connected to memory 628 such as RAM, ROM, nonvolatile memory such as flash memory and/or other suitable electronic data storage. Embodiments of the present invention may also implement one or more wireless communication interfaces 629 for wireless local area networking (WLAN), wireless personal area networking (WPAN) and/or other wireless communication.

Figure 6B:
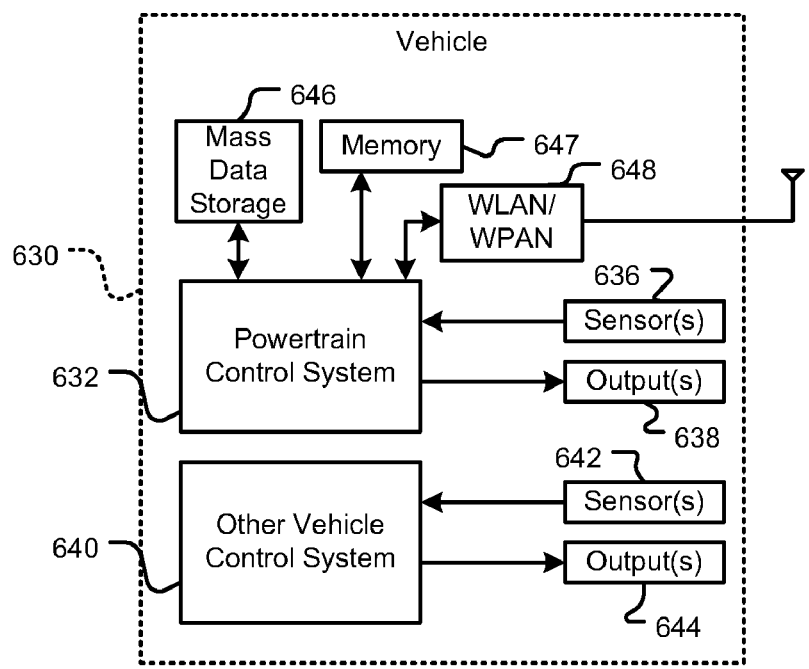

Referring now to FIG. 6B, embodiments of the present invention may implement a control system of a vehicle 630, a wireless interface 648 and/or mass data storage 646 of the vehicle control system. In some implementations, embodiments of the present invention implement a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. Embodiments of the present invention may also implement one or more wireless communication interfaces 648 for wireless local area networking (WLAN), wireless personal area networking (WPAN) and/or other wireless communication.

Embodiments of the present invention may also be implemented in other control systems 640 of the vehicle 630. The control system 640 may likewise receive signals from input sensors 642 and/or output control signals to one or more output devices 644. In some implementations, the control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 632 may communicate with mass data storage 646 that stores data in a nonvolatile manner. The mass data storage 646 may include optical and/or magnetic storage devices (for example, hard disk drives [HDDs] and/or DVDs). The HDD may be a mini HDD that includes one or more platters having a diameter that is smaller than approximately 1.8". The powertrain control system 632 may be connected to memory 647 such as RAM, ROM, nonvolatile memory such as flash memory and/or other suitable electronic data storage. The powertrain control system 632 also may support connections with a WLAN via a WLAN network interface 648. The control system 640 may also include mass data storage, memory and/or one or more wireless interfaces (all not shown).

Figure 6C:
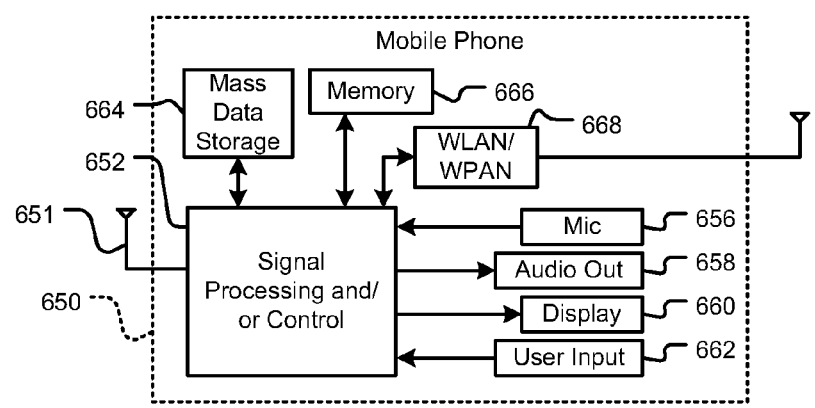

Referring now to FIG. 6C, embodiments of the present invention can be implemented in a cellular and/or mobile phone 650 that may include an antenna 651. Embodiments of the present invention may implement either or both signal processing and/or control circuits, which are generally identified in FIG. 6C at 652, a WLAN interface and/or mass data storage of the mobile phone 650. In some implementations, the phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices (for example, hard disk drives [HDDs] and/or DVDs). The HDD may be a mini HDD that includes one or more platters having a diameter that is smaller than approximately 1.8". The cellular phone 650 may be connected to memory 666 such as RAM, ROM, nonvolatile memory such as flash memory and/or other suitable electronic data storage. Embodiments of the present invention may also implement one or more wireless communication interfaces 668 for wireless local area networking (WLAN), wireless personal area networking (WPAN) and/or other wireless communication.

Figure 6D:
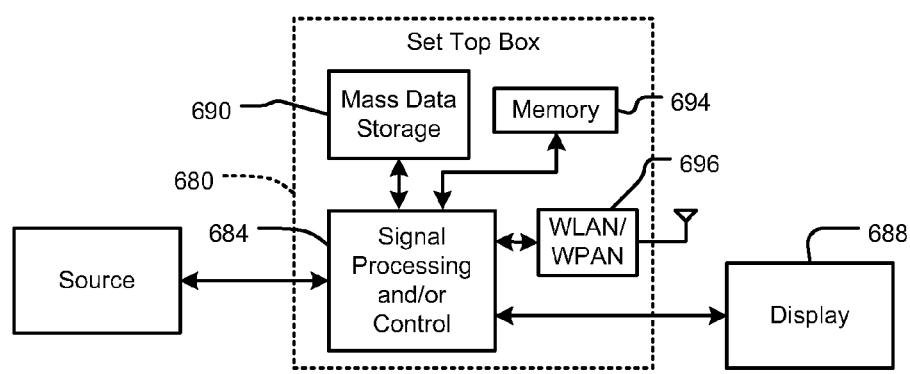

Referring now to FIG. 6D, embodiments of the present invention can be implemented in a set top box 680. Embodiments of the present invention may implement either or both signal processing and/or control circuits, which are generally identified in FIG. 6D at 684, a WLAN interface and/or mass data storage of the set top box 680. The set top box 680 receives signals from a source such as a broadband source and outputs standard and/or high definition audio/video signals suitable for a display 688 such as a television and/or monitor and/or other video and/or audio output devices. The signal processing and/or control circuits 684 and/or other circuits (not shown) of the set top box 680 may process data, perform coding and/or encryption, perform calculations, format data and/or perform any other set top box function.

The set top box 680 may communicate with mass data storage 690 that stores data in a nonvolatile manner. The mass data storage 690 may include optical and/or magnetic storage devices (for example, hard disk drives [HDDs] and/or DVDs). The HDD may be a mini HDD that includes one or more platters having a diameter that is smaller than approximately 1.8". The set top box 680 may be connected to memory 694 such as RAM, ROM, nonvolatile memory such as flash memory and/or other suitable electronic data storage Embodiments of the present invention may also implement one or more wireless communication interfaces 696 for wireless local area networking (WLAN), wireless personal area networking (WPAN) and/or other wireless communication.

Figure 6E:
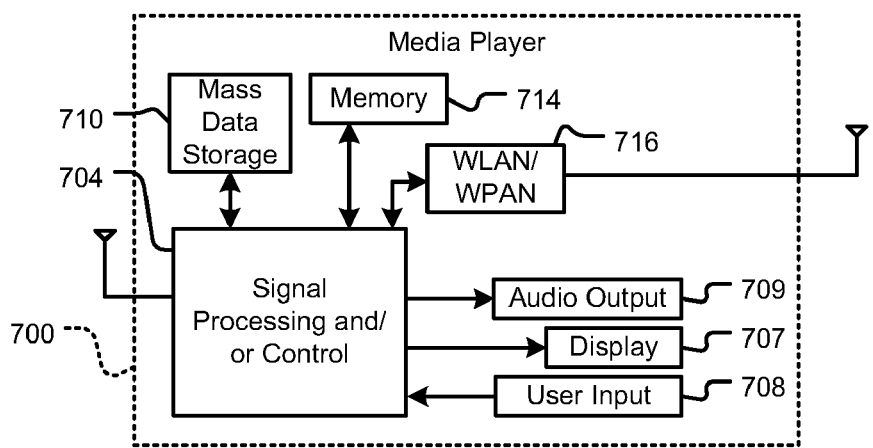

Referring now to FIG. 6D, embodiments of the present invention can be implemented in a media player 500. Embodiments of the present invention may implement either or both signal processing and/or control circuits, which are generally identified in FIG. 6E at 504, a wireless interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). The HDD may be a mini HDD that includes one or more platters having a diameter that is smaller than approximately 1.8". The media player 500 may be connected to memory 514 such as RAM, ROM, nonvolatile memory such as flash memory and/or other suitable electronic data storage. Embodiments of the present invention may also implement one or more wireless communication interfaces 716 for wireless local area networking (WLAN), wireless personal area networking (WPAN) and/or other wireless communication.

Figure 6F:
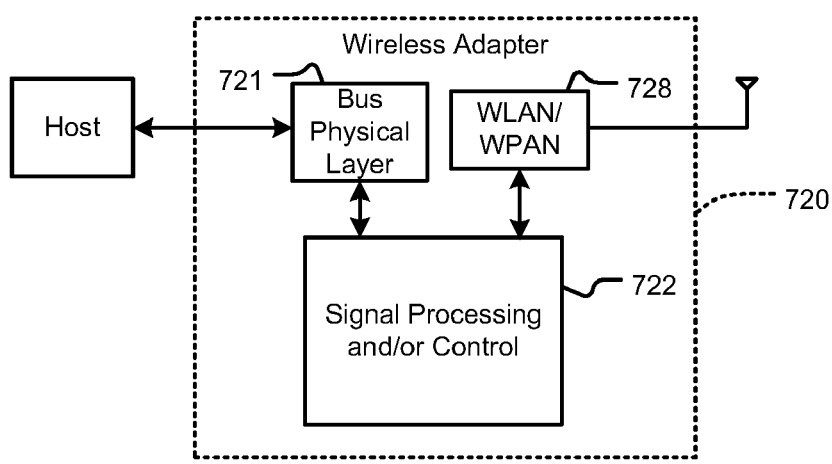

Referring now to FIG. 6F, embodiments of the present invention can be implemented in a wireless adapter 720. Embodiments of the present invention may implement either or both signal processing and/or control circuits 722, and/or one or more wireless communication interfaces 728 for wireless local area networking (WLAN), wireless personal area networking (WPAN) and/or other wireless communication. Wireless adapter 720 generally provides one or more wireless network interfaces to a host device over a data communication bus such as Universal Serial Bus (USB), Secure Digital Input Output (SDIO), etc. Still other implementations in addition to those described above are contemplated.

CONCLUSION/SUMMARY

Thus, embodiments of the present invention include circuits, architectures, systems, methods, algorithms, and software and/or firmware for arbitrating media access requests from multiple wireless communication protocol components. Embodiments of present invention advantageously provide for more reliable arbitration of media access requests from multiple wireless communication protocol components during and after power saving modes of operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for arbitrating media access requests from a plurality of wireless components, said circuit comprising:

a request processing circuit configured to:

set a positive media access grant output for a first wireless component of said plurality of wireless components just prior to the request processing circuit entering a power saving mode of operation;

while the request processing circuit exits said power saving mode of operation, determine a waking media access state of said first wireless component, wherein:

a first value of said media access state corresponds to a determination of a presence of signal activity between said first wireless component and an antenna at a time of the request processing circuit exiting the power saving mode, and a second value of said media access state corresponds to a determination of an absence of said signal activity at the time of the request processing circuit exiting the power saving mode; and process media access requests from said plurality of wireless components based on said waking media access state of said first wireless component.

2. The circuit of claim 1, wherein said request processing circuit is further configured to enter said power saving mode of operation in response to a power mode of a second wireless component of said plurality of wireless components.

3. The circuit of claim 2, wherein said request processing circuit is further configured to operate in a shared clock domain with said second wireless component.

4. The circuit of claim 3, wherein one or more clock signals in said shared clock domain are stopped during said power saving mode of operation.

5. The circuit of claim 1, wherein said waking media access state of said first wireless component further corresponds to a transmit and/or receive direction of said signal activity and/or a priority of said signal activity.

6. The circuit of claim 1, wherein said request processing circuit is further configured to process said media access grant outputs according to a first arbitration protocol in response to said first value of said media access state and according to said second arbitration protocol in response to said second value of said media access state.

7. The circuit of claim 6, wherein said first arbitration protocol comprises favoring said first wireless component.

8. The circuit of claim 6, wherein said request processing circuit is further configured to arbitrate said media access requests according to said second arbitration protocol after said signal activity ends.

9. The circuit of claim 1, wherein a second wireless component of said plurality of wireless components comprises a wireless local area network (WLAN) protocol component.

10. The circuit of claim 9, wherein said request processing circuit is configured to enter said power saving mode of operation in response to a sleep mode of said WLAN protocol component during a delivery traffic indication message (DTIM) interval.

11. The circuit of claim 10, wherein said request processing circuit is configured to exit said power saving mode of operation in response to a wake mode of said WLAN protocol component, wherein said WLAN protocol component is configured to enter said wake mode to listen for a DTIM beacon.

12. The circuit of claim 10, wherein said request processing circuit is further configured to pre-assert a WLAN grant request to listen for said DTIM beacon in response to said wake mode.

13. The circuit of claim 1, wherein said first wireless component comprises a Bluetooth component.

14. The circuit of claim 13, wherein said request processing circuit is further configured to predict said waking media access state based on a Bluetooth data link type and/or a Bluetooth profile supported by said Bluetooth component.

15. The circuit of claim 1, further comprising a signal activity monitoring circuit configured to monitor said signal activity between said first wireless component and an antenna.

16. The circuit of claim 15, wherein:
said signal activity monitoring circuit is configured to operate during said power saving mode of operation of said request processing circuit; and
said request processing circuit is configured to determine said waking media access state based on an output of said signal activity monitoring circuit.

17. The circuit of claim 15, wherein said signal activity monitoring circuit is configured to:
store information about said signal activity in a memory during a normal mode of operation of said request processing circuit; and
sleep during said power saving mode of operation of said request processing circuit.

18. The circuit of claim 17, further comprising an analysis circuit configured to analyze said stored information to predict said waking media access state.

19. An integrated circuit device comprising the circuit of claim 1.

20. An apparatus for transmitting and receiving radio frequency signals, said apparatus comprising:
the circuit for arbitrating media access requests of claim 1; and
said plurality of wireless components.

21. A method for arbitrating media access requests from a plurality of wireless components, said method comprising:
setting, by an arbiter, a positive media access grant indicator for a first wireless component of said plurality of wireless components just prior to the arbiter entering a power saving mode of operation;
while the arbiter exits said power saving mode of operation, determining a waking media access state of said first wireless component, wherein:
a first value of said media access state corresponds to a determination of a presence of signal activity between said first wireless component and an antenna, and
a second value of said media access state corresponds to a determination of an absence of said signal activity; and
processing, at the arbiter, media access requests from said plurality of wireless components based on said waking media access state of said first wireless component.

22. The method of claim 21, further comprising causing the arbiter to enter said power saving mode of operation in response to a power mode of a second wireless component of said plurality of wireless components.

23. The method of claim 21, wherein said waking media access state of said first wireless component further corresponds to a transmit and/or receive direction of said signal activity, and to a priority of said signal activity.

24. The method of claim 23, further comprising processing said media access requests according to a first arbitration protocol in response to said first value of said media access state and according to a second arbitration protocol in response to said second value of said media access state.

25. The method of claim 24, wherein
said first arbitration protocol comprises favoring said first wireless component.

26. The method of claim 25, further comprising processing said media access grant requests according to said second arbitration protocol after said signal activity ends.

27. The method of claim 21, wherein said first wireless component comprises a Bluetooth component and a second wireless component of said plurality of wireless components comprises a wireless local area network (WLAN) protocol component.

28. The method of claim 27, further comprising:
causing the arbiter to enter said power saving mode of operation in response to a sleep mode of said WLAN protocol component during a delivery traffic indication message (DTIM) interval; and
causing the arbiter to exit said power saving mode of operation in response to a wake mode of said WLAN protocol component, wherein said WLAN protocol component is configured to enter said wake mode to listen for a DTIM beacon.

29. A computer-readable medium comprising computer-readable instructions adapted to perform the method of claim 21.

30. A programmable integrated circuit device configured to perform the method of claim 21.

31. A computer-readable medium comprising instructions adapted to configure an integrated circuit device to perform the method of claim 21.

* * * * *